United States Patent
Kudo et al.

(10) Patent No.: US 10,610,965 B2
(45) Date of Patent: Apr. 7, 2020

(54) LASER PROCESSING APPARATUS AND METHOD OF FORMING THROUGH-HOLE

(71) Applicant: DISCO CORPORATION, Tokyo (JP)

(72) Inventors: Yu Kudo, Tokyo (JP); Keiji Nomaru, Tokyo (JP)

(73) Assignee: DISCO CORPORATION, Tokyo (JP)

( * ) Notice: Subject to any disclaimer, the term of this patent is extended or adjusted under 35 U.S.C. 154(b) by 195 days.

(21) Appl. No.: 15/184,682

(22) Filed: Jun. 16, 2016

(65) Prior Publication Data
US 2016/0368088 A1 Dec. 22, 2016

(30) Foreign Application Priority Data

Jun. 18, 2015 (JP) .................. 2015-123270

(51) Int. Cl.
| | |
|---|---|
| *B23K 26/082* | (2014.01) |
| *B23K 26/402* | (2014.01) |
| *B23K 26/382* | (2014.01) |
| *B23K 26/70* | (2014.01) |
| *B23K 26/384* | (2014.01) |
| *H01L 21/76* | (2006.01) |
| *H01L 21/683* | (2006.01) |

(Continued)

(52) U.S. Cl.
CPC .......... *B23K 26/082* (2015.10); *B23K 26/382* (2015.10); *B23K 26/402* (2013.01); *B23K 2103/50* (2018.08); *B23K 2103/56* (2018.08)

(58) Field of Classification Search
CPC .............. B23K 2203/56; B23K 26/082; B23K 26/382; B23K 26/402; B23K 2203/50; B23K 26/0648; B23K 26/00; B23K 26/02; B23K 26/035; B23K 26/04; B23K 26/042; B23K 26/043; B23K 26/06; B23K 26/062; B23K 26/064; B23K 26/073; G02B 26/126; G02B 26/08; G02B 26/10; G02B 26/01
USPC .......... 264/400; 219/121.65, 121.61, 121.74; 359/858
See application file for complete search history.

(56) References Cited

U.S. PATENT DOCUMENTS

| | | | | |
|---|---|---|---|---|
| 5,072,091 | A * | 12/1991 | Nagata .................. | B23K 26/06 219/121.68 |
| 5,925,271 | A * | 7/1999 | Pollack ................. | B23K 26/02 219/121.74 |

(Continued)

FOREIGN PATENT DOCUMENTS

JP    2008-119741    5/2008

*Primary Examiner* — Matthew J Daniels
*Assistant Examiner* — Yunju Kim
(74) *Attorney, Agent, or Firm* — Greer Burns & Crain Ltd.

(57) ABSTRACT

A laser processing apparatus includes a laser beam applying unit. The laser beam applying unit includes a laser oscillator for oscillating a laser beam, a focusing lens for focusing the laser beam to apply the laser beam to a wafer, a first optical path changing part, a second optical path changing part, and a controller. The first optical path changing part has a pair of first-axis resonant scanners which are disposed on the downstream side with respect to the propagating direction of the laser beam oscillated from the laser oscillator and which change the optical path of the laser beam into a Y-axis direction. The second optical path changing part has a pair of second-axis resonant scanners which are disposed between the first optical path changing part and the focusing lens and which change the optical path of the laser beam into an X-axis direction.

5 Claims, 6 Drawing Sheets (51) Int. Cl.
*H01L 21/268* (2006.01)
*H01L 21/02* (2006.01)
*B23K 103/00* (2006.01)

(56) References Cited

U.S. PATENT DOCUMENTS

2006/0151449 A1* 7/2006 Warner, Jr. ........ B23K 26/0066
219/121.65
2014/0014631 A1* 1/2014 Morikazu .............. B23K 26/02
219/121.61

* cited by examiner

LASER PROCESSING APPARATUS AND METHOD OF FORMING THROUGH-HOLE

BACKGROUND OF THE INVENTION

Field of the Invention

The present invention relates to a laser processing apparatus and a method of forming a through-hole.

Description of the Related Art

In a semiconductor manufacturing process, formation of through-holes by applying a laser beam has been conducted. In order to form a multiplicity of through-holes at a high speed, perforation while deflecting the direction of a laser beam at a high speed by use of a Galvano scanner, an acousto-optic device (AOD) or the like has been carried out (see, for example, Japanese Patent Laid-Open No. 2008-119741).

SUMMARY OF THE INVENTION

Japanese Patent Laid-Open No. 2008-119741 discloses a method of forming a multiplicity of through-holes in a wafer with high productivity. Here, it is generally desirable that a through-hole has such a shape that its side wall and its bottom surface are perpendicular to each other. According to the related-art method disclosed in Japanese Patent Laid-Open No. 2008-119741, however, the through-holes may not be formed in a desired shape but may be formed in a tapered shape, with the side wall and the bottom surface not being perpendicular to each other, since the incidence angle of the laser beam is fixed for one through-hole being formed.

Accordingly, it is an object of the present invention to provide a laser processing apparatus capable of processing a workpiece into a desired shape, and a method of forming a through-hole by which through-holes can be processed in a desired shape.

In accordance with an aspect of the present invention, there is provided a laser processing apparatus for perforating a workpiece, including: a chuck table on which to hold the workpiece; a laser beam applying unit that applies a laser beam; and a control unit that controls the laser processing apparatus, wherein the laser beam applying unit includes a laser beam oscillation unit that oscillates the laser beam, a focusing lens by which the laser beam oscillated from the laser beam oscillation unit is focused and applied to the workpiece held on the chuck table, first optical path changing means having a pair of first-axis resonant scanners which are disposed on a downstream side with respect to a propagating direction of the laser beam oscillated from the laser beam oscillation unit and which change an optical path of the laser beam in relation to an optical axis of the focusing lens, and second optical path changing means having a pair of second-axis resonant scanners which are disposed between the first optical path changing means and the focusing lens and which change the optical path of the laser beam in relation to the optical axis of the focusing lens.

Preferably, the pair of first-axis resonant scanners and the pair of second-axis resonant scanners are oscillated with the paired resonant scanners in a same phase.

In accordance with another aspect of the present invention, there is provided a method of forming a through-hole in a workpiece by applying a laser beam to the workpiece by a laser processing apparatus, the method including: a step of oscillating a laser beam from a laser beam oscillation unit; a step of guiding the oscillated laser beam to a pair of first-axis resonant scanners to change an optical path of the laser beam into a first axis direction relative to an optical axis of a focusing lens; a step of guiding the laser beam passed through the pair of first-axis resonant scanners to a pair of second-axis resonant scanners to change the optical path of the laser beam into a second axis direction orthogonal to the first axis direction; and a step of applying the laser beam whose optical path has been changed into the first axis direction and the second axis direction to the workpiece held by a chuck table.

Preferably, in the method of forming a through-hole, oscillation is conducted with the first-axis resonant scanners and the second-axis resonant scanners fixed at a phase difference of 90°, thereby forming the through-hole.

Preferably, in the method of forming a through-hole, the pair of first-axis resonant scanners and the pair of second-axis resonant scanners are oscillated with the paired resonant scanners in a same phase.

According to the laser processing apparatus and the method of forming a through-hole of the present invention, it is possible to perform laser processing by which a workpiece can be processed into a desired shape.

The above and other objects, features and advantages of the present invention and the manner of realizing them will become more apparent, and the invention itself will best be understood from a study of the following description and appended claims with reference to the attached drawings showing a preferred embodiment of the invention.

DETAILED DESCRIPTION OF THE PREFERRED EMBODIMENT

A mode for carrying out the present invention (namely, an embodiment) will be described in detail below, referring to the drawings. The present invention is not to be limited by the contents of the following description of the embodiment. In addition, each of the components described below includes those which can be easily supposed by one skilled in the art and those which are substantially the same as or equivalent to the described. Further, the configurations described below can be combined with one another in an appropriate manner. Besides, various omissions, replacements or modifications of the configurations are possible without departing from the scope of the gist of the present invention.

Figure 1:
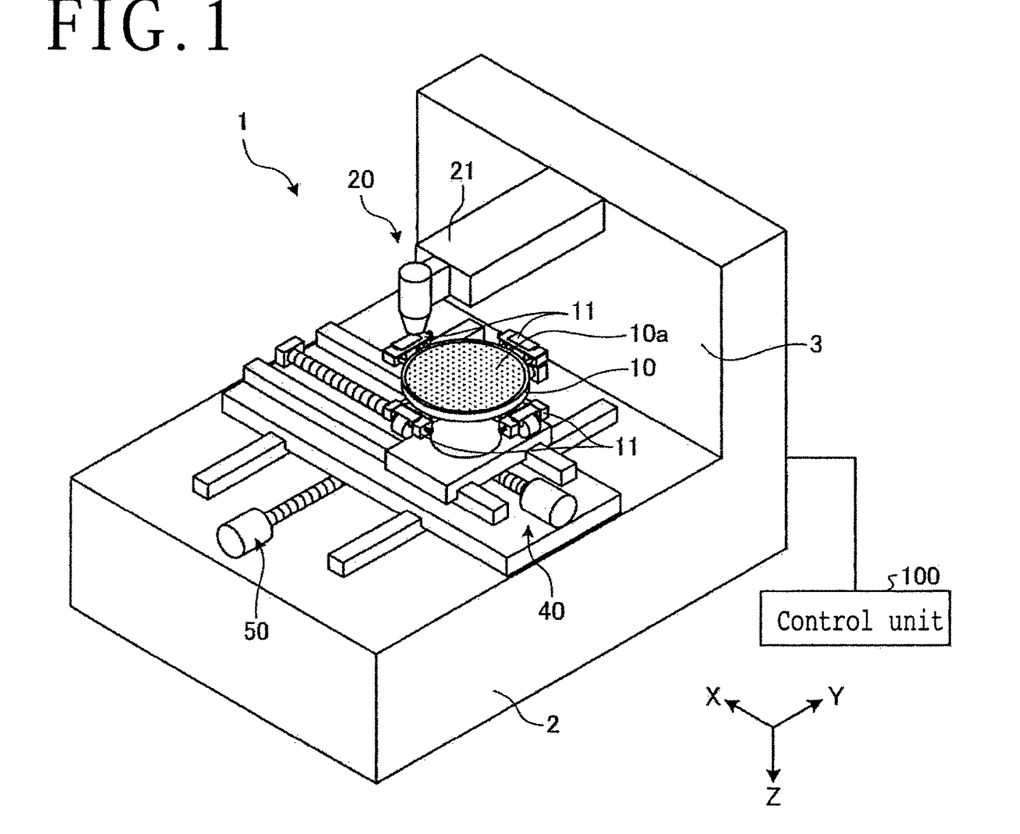
FIG. 1 is a perspective view showing a configuration example of a laser processing apparatus according to an embodiment of the present invention.

A method of forming a through-hole according to the embodiment is a method carried out by a laser processing apparatus 1 illustrated in FIG. 1 (that is, a method in which the laser processing apparatus 1 is used). The laser processing apparatus 1 is an apparatus for perforating a wafer W serving as a workpiece.

Figure 2:
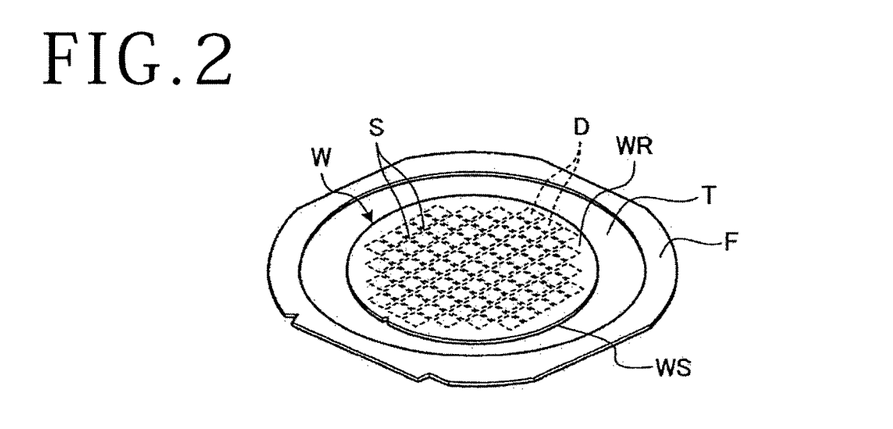
FIG. 2 is a perspective view of a wafer and the like, the wafer being an object of processing by the laser processing apparatus shown in FIG. 1.
Figure 6:
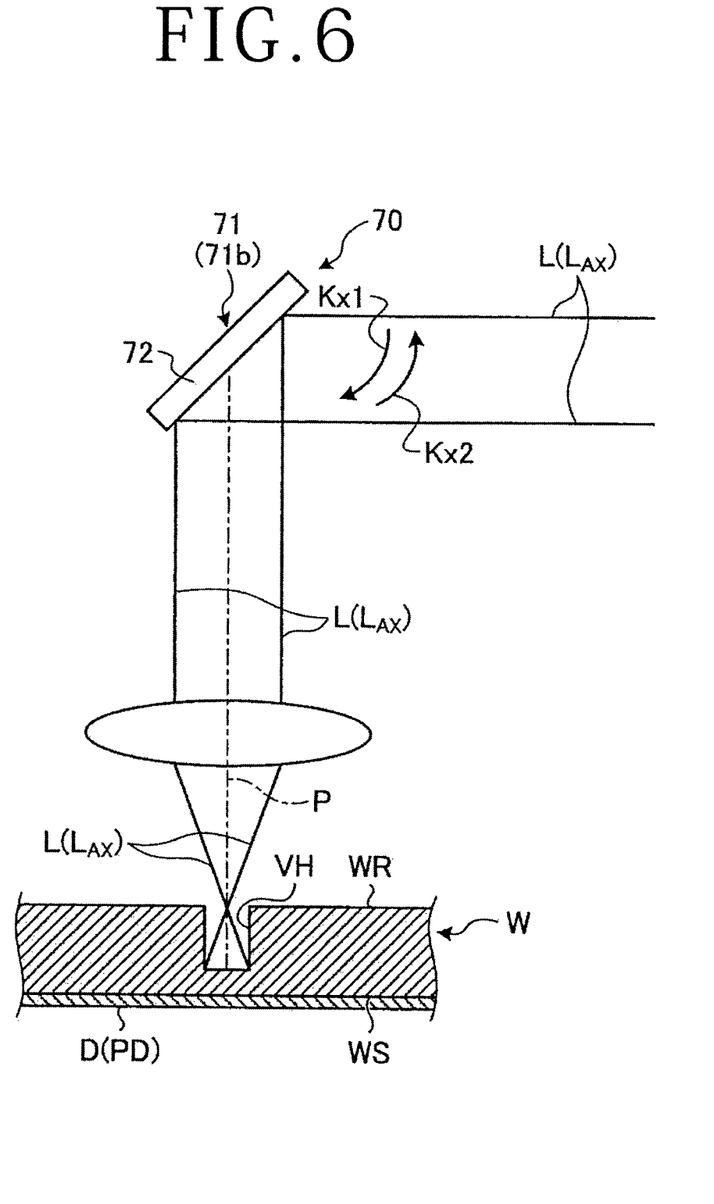
FIG. 6 is a sectional view showing a condition wherein a laser beam emitted from a second scanner of the second optical path changing means of the laser beam applying unit shown in FIG. 3 perforates a workpiece.
Figure 7:
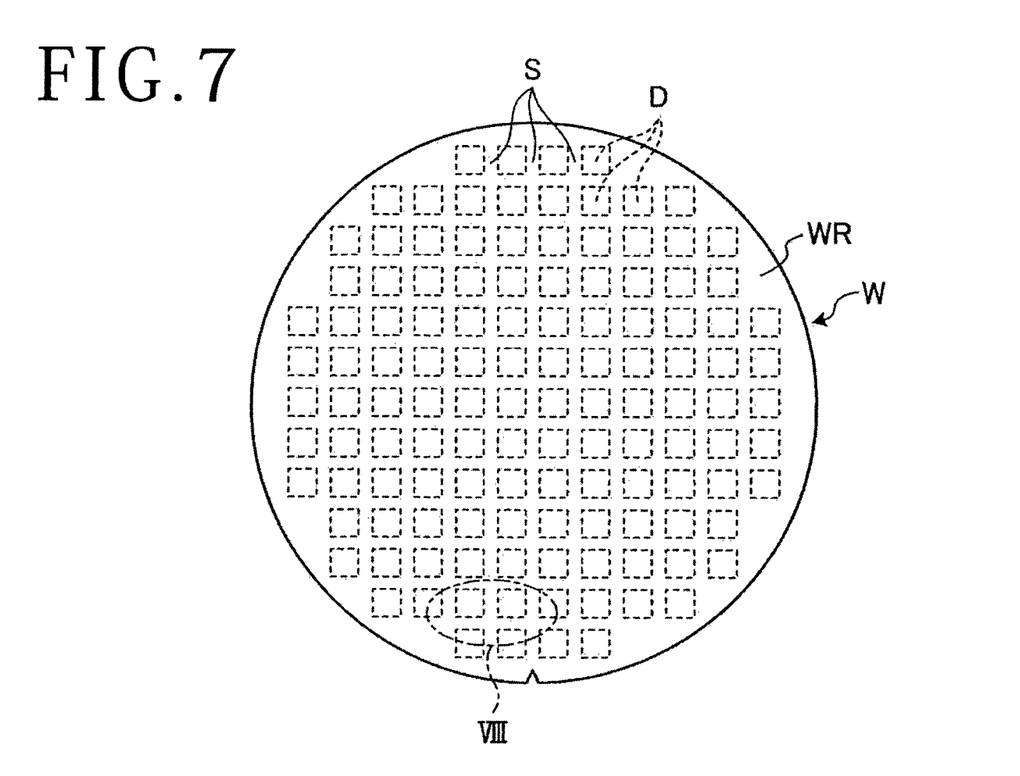
FIG. 7 is a plan view of a wafer formed with through-holes by a method of forming a through-hole according to the embodiment.

As shown in FIGS. 2 and 7, the wafer W to be perforated by the laser processing apparatus 1 in this embodiment is a disk-shaped semiconductor wafer or an optical device wafer whose base material is silicon, sapphire, gallium or the like. The wafer W has devices D formed in regions partitioned by a plurality of crossing division lines S formed on a front side WS thereof. The wafer W is cut along the division lines S, whereby the regions formed with the devices D are separated from each other, to produce individual semiconductor chips. An adhesive tape T is adhered to the front side WS formed with the plurality of devices D of the wafer W, and the outer edge of the adhesive tape T is adhered to an annular frame F, whereby the wafer W is supported at the opening of the annular frame F through the adhesive tape T. The wafer W is formed with through-holes VH (shown in FIG. 8) which are holes extending from a back side WR, on the back side of the front side WS, to reach bonding pads PD (shown in FIG. 6) of the devices D.

The laser processing apparatus 1 forms the through-holes VH reaching the bonding pads PD from the back side WR at positions where the bonding pads PD are formed, of the front side WS of the wafer W. As illustrated in FIG. 1, the laser processing apparatus 1 includes, at least: a chuck table 10 (corresponding to workpiece holding means) for holding the wafer W; a laser beam applying unit 20 for applying a laser beam L (shown in FIG. 3) in order to form the through-holes VH from the back side WR of the wafer W held on the chuck table 10; X-axis moving means 40; Y-axis moving means 50; and a control unit 100.

The chuck table 10 has a holding surface 10a on which the wafer W before processed is placed, whereby the wafer W adhered to the opening of the annular frame F through the adhesive tape T is held. Of the chuck table 10, a portion constituting the holding surface 10a is formed in a disk shape from a porous ceramic or the like, and is connected with a vacuum source (not shown) through an evacuation path (not shown), whereby the wafer W placed on the holding surface 10a is suction held through the adhesive tape T. Note that the chuck table 10 is subjected to processing feed in an X-axis direction by the X-axis moving means 40, is rotated about a center axis (parallel to a Z axis) by a rotational drive source (not shown), and is subjected to indexing feed in a Y-axis direction by the Y-axis moving means 50. In addition, at the periphery of the chuck table 10, there are provided a plurality of clamp parts 11 which are driven by an air actuator to clamp the annular frame F surrounding the wafer W.

The laser beam applying unit 20 applies the laser beam L of such a wavelength (for example, 355 nm) as to be absorbed in the wafer W to the wafer W held on the chuck table 10, thereby forming a through-hole VH from the side of the back side WR of the wafer W. Specifically, the laser beam applying unit 20 applies the laser beam L of such a wavelength as to be absorbed in the wafer W to the side of the back side WR of the wafer W, thereby performing ablation processing of the wafer W.

Figure 3:
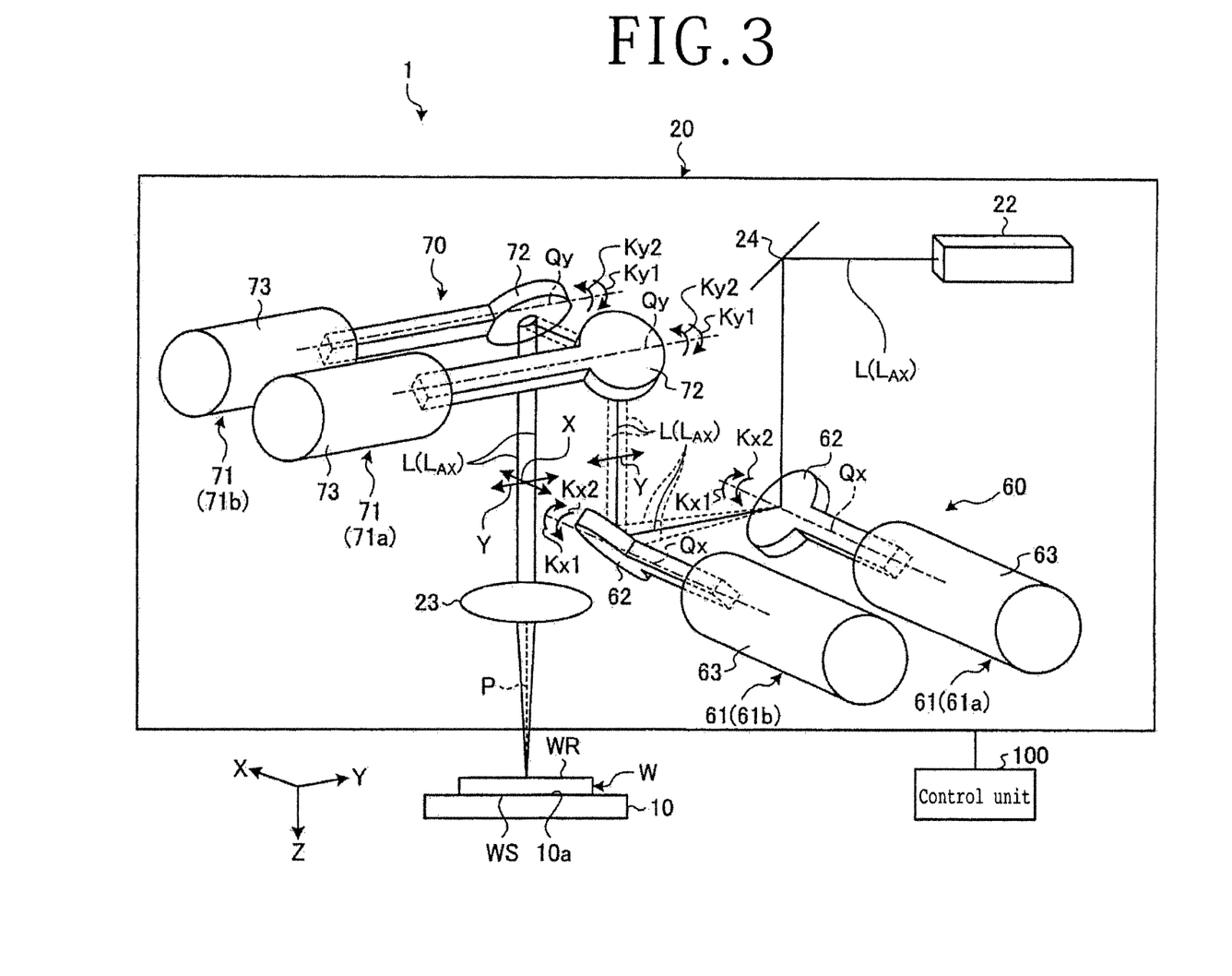
FIG. 3 shows a configuration example of a laser beam applying unit of the laser processing apparatus shown in FIG. 1.

As shown in FIGS. 1 and 3, the laser beam applying unit 20 includes a casing 21 supported by a column part 3 of an apparatus main body 2, a laser oscillator 22 (corresponding to a laser beam oscillation unit), a focusing lens 23, first optical path changing means 60, second optical path changing means 70, and a mirror 24.

The laser oscillator 22 oscillates the laser beam L of such a wavelength as to be absorbed in the wafer W. The focusing lens 23 is provided at a tip portion of the casing 21 oppositely to the holding surface 10a of the chuck table 10. The focusing lens 23 focuses the laser beam L oscillated from the laser oscillator 22 onto the wafer W held on the chuck table 10. It is preferable to use an f-θ lens, desirably a telecentric f-θ lens, as the focusing lens 23. In this embodiment, the laser processing apparatus 1 uses a telecentric f-θ lens as the focusing lens 23.

As shown in FIG. 3, the first optical path changing means 60 has a pair of first-axis resonant scanners 61 which are disposed on the downstream side with respect to a propagating direction of the laser beam L from the laser oscillator 22 and by which an optical path $L_{AX}$ of the laser beam L is made to be eccentric relative to an optical axis P (shown in FIG. 3) of the focusing lens 23 into a direction parallel to the Y-axis direction (corresponding to a first axis direction). The first optical path changing means 60 reciprocally vibrates the optical path $L_{AX}$ of the laser beam L from the laser oscillator 22 in the Y-axis direction (corresponding to the first axis direction). The pair of first-axis resonant scanners 61 are disposed at an interval in the Y-axis direction. The first-axis resonant scanner 61 includes a flat plate-shaped mirror 62 provided to be rotatable about an axis Qx parallel to the X-axis direction, and a scanning part 63 for rotating the mirror 62 about the axis Qx by a resonating motion.

The laser beam L oscillated by the laser oscillator 22 is incident on a mirror 62 of a first-axis resonant scanner 61 on one side (hereinafter denoted by symbol 61a), by way of the mirror 24 disposed between the laser oscillator 22 and the first optical path changing means 60. The mirror 62 of the first-axis resonant scanner 61a on the one side reflects the laser beam L toward a first-axis resonant scanner 61 on the other side (hereinafter denoted by symbol 61b). A mirror 62 of the first-axis resonant scanner 61b on the other side reflects the laser beam L toward the second optical path changing means 70.

Figure 4:
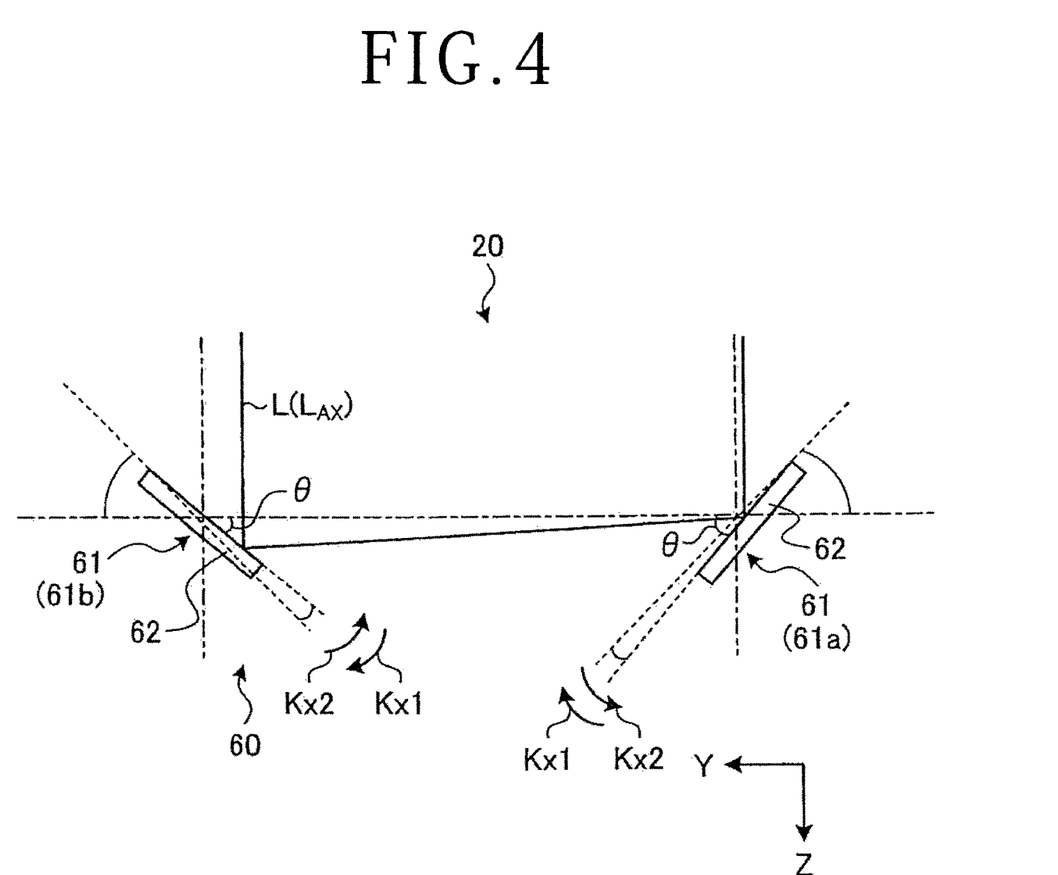
FIG. 4 schematically shows a configuration example of first optical path changing means of the laser beam applying unit shown in FIG. 3.
Figure 5A:
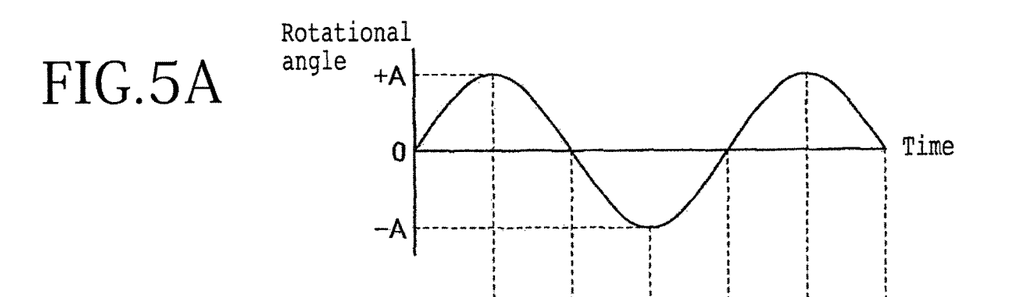
FIG. 5A is a diagram showing variation in rotational angle of a mirror of a first-axis resonant scanner on one side of the first optical path changing means of the laser beam applying unit shown in FIG. 3.
Figure 5B:
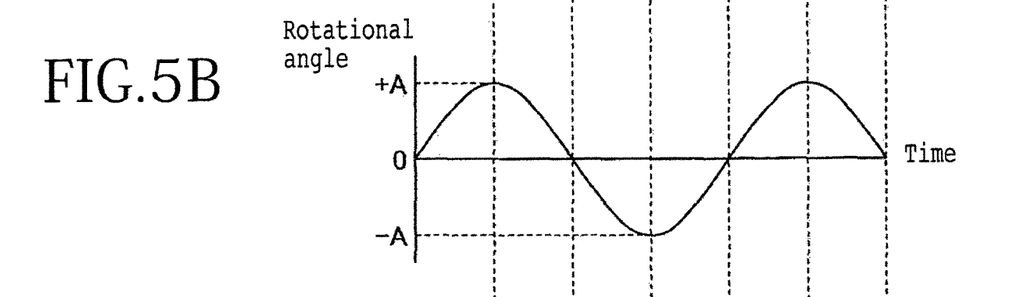
FIG. 5B is a diagram showing variation in rotational angle of a mirror of a first-axis resonant scanner on the other side of the first optical path changing means of the laser beam applying unit shown in FIG. 3.

As shown in FIG. 5A, the mirror 62 of the first-axis resonant scanner 61a on the one side is rotated by the scanning part 63 in such a manner that its angle about the axis Qx forms a sine curve as time passes, wherein its angle when the mirror 62 is rotated such as to reflect the laser beam L into a direction parallel to the Y-axis direction toward the mirror 62 of the first-axis resonant scanner 61b on the other side is taken as zero (an angle of 0°). As shown in FIG. 5B, the mirror 62 of the first-axis resonant scanner 61b on the other side is rotated by the scanning part 63 in such a manner that its angle about the axis Qx forms a sine curve as time passes, wherein its angle when the mirror 62 is rotated such as to reflect the laser beam L parallel to the Y-axis direction into a direction parallel to the Z-axis direction toward the second optical path changing means 70 is taken as zero (an angle of 0°). In other words, in the direction corresponding to the angle being zero, the angle θ (shown in FIG. 4) of a reflecting surface of the mirror 62 relative to the Y axis is 45°. Besides, the mirror 62 of the first-axis resonant scanner 61a on the one side and the mirror 62 of the first-axis resonant scanner 61b on the other side are rotated in the same direction about the axes Qx in an interlocked manner.

Specifically, when the mirror 62 of the first-axis resonant scanner 61a on the one side is rotated in a direction of arrow Kx1 (shown in FIG. 4) about the axis Qx, the mirror 62 of the first-axis resonant scanner 61b on the other side is rotated in a direction of arrow Kx1 (shown in FIG. 4) about the axis Qx. When the mirror 62 of the first-axis resonant scanner 61a on the one side is rotated in a direction of arrow Kx2 opposite to arrow Kx1 about the axis Qx, the mirror 62 of the first-axis resonant scanner 61b on the other side is rotated in a direction of arrow Kx2 opposite to arrow Kx1 about the axis Qx. In addition, a maximum deflection angle A of the mirror 62 of the first-axis resonant scanner 61a on the one side and a maximum deflection angle A of the mirror 62 of the first-axis resonant scanner 61b on the other side are equal, a rotational frequency of the mirror 62 of the first-axis resonant scanner 61a on the one side and a rotational frequency of the mirror 62 of the first-axis resonant scanner 61b on the other side are equal, and the mirrors 62 are rotated about the axes Qx by the scanning parts 63. The rotation of the mirror 62 of the first-axis resonant scanner 61a on the one side from the direction corresponding to the zero angle and the rotation of the mirror 62 of the first-axis resonant scanner 61b on the other side from the direction corresponding to the zero angle are equal in phase when the mirrors 62 are rotated about the axes Qx by the scanning parts 63. In this way, the pair of first-axis resonant scanners 61a and 61b are oscillated with the paired resonant scanners in the same phase.

As shown in FIG. 3, the second optical path changing means 70 has a pair of second-axis resonant scanners 71 which are disposed between the first optical path changing means 60 and the focusing lens 23 and by which the optical path $L_{AX}$ of the laser beam L is changed into a direction parallel to the X-axis direction (corresponding to a second axis direction) relative to the optical axis P of the focusing lens 23. As shown in FIG. 3, the second optical path changing means 70 reciprocally vibrates the optical path $L_{AX}$ of the laser beam L from the laser oscillator 22 in the X-axis direction (corresponding to the second axis direction). The pair of second-axis resonant scanners 71 are disposed at an interval in the X-axis direction. The second-axis resonant scanner 71 includes a flat plate-shaped mirror 72 provided to be rotatable about an axis Qy parallel to the Y-axis direction, and a scanning part 73 that rotates the mirror 72 about the axis Qy by a resonating motion.

The laser beam L reflected by the mirror 62 of the first-axis resonant scanner 61b on the other side is incident on the mirror 72 of a second-axis resonant scanner 71 on one side (hereinafter denoted by symbol 71a). The mirror 72 of the second-axis resonant scanner 71a on the one side reflects the laser beam L toward a second-resonant scanner 71 on the other side (hereinafter denoted by symbol 71b). The mirror 72 of the second-axis resonant scanner 71b on the other side reflects the laser beam L toward the focusing lens 23.

Figure 5C:
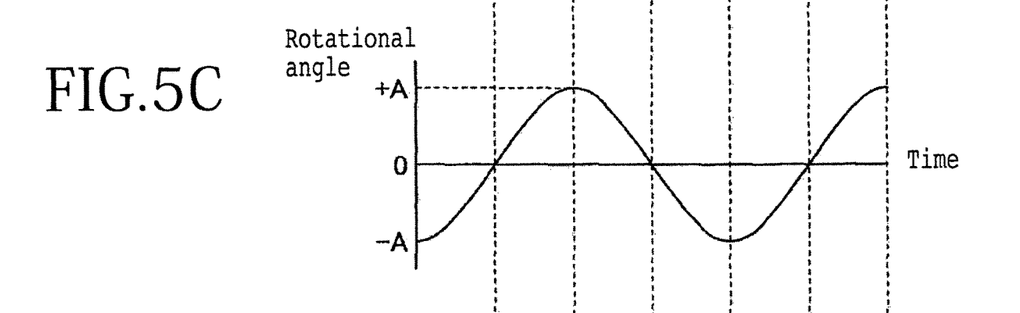
FIG. 5C is a diagram showing variation in rotational angle of a mirror of a second-axis resonant scanner on one side of second optical path changing means of the laser beam applying unit shown in FIG. 3.
Figure 5D:
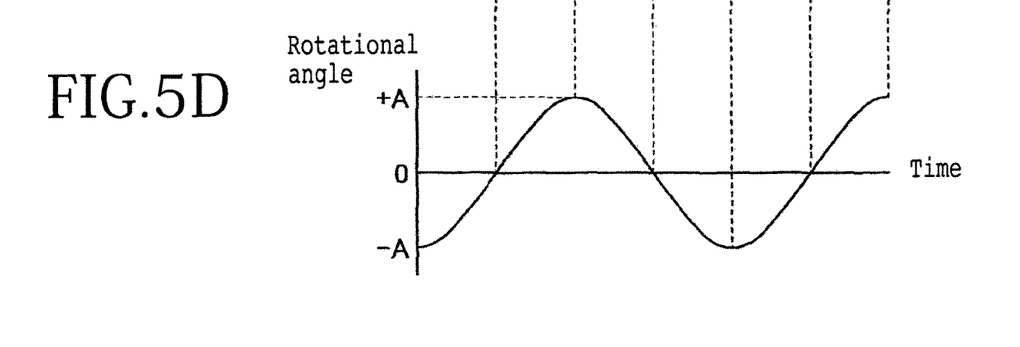
FIG. 5D is a diagram showing variation in rotational angle of a mirror of a second-axis resonant scanner on the other side of the second optical path changing means of the laser beam applying unit shown in FIG. 3.

As shown in FIG. 5C, the mirror 72 of the second-axis resonant scanner 71a on the one side is rotated by the scanning part 73 in such a manner that its angle about the axis Qy forms a sine curve as time passes, wherein its angle when the mirror 72 is rotated such as to reflect the laser beam L parallel to the Z-axis direction into a direction parallel to the X-axis direction toward the mirror 72 of the second-axis resonant scanner 71b on the other side is taken as zero (an angle of 0°). As shown in FIG. 5D, the mirror 72 of the second-axis resonant scanner 71b on the other side is rotated by the scanning part 73 in such a manner that its angle about the axis Qy forms a sine curve as time passes, wherein its angle when the mirror 72 is rotated such as to reflect the laser beam L parallel to the X-axis direction into a direction parallel to the Z-axis direction toward the focusing lens 23 is taken as zero (an angle of 0°). In other words, in the direction corresponding to the angle being zero, the angle of a reflecting surface of the mirror 72 relative to the X-axis direction is 45°. In addition, the mirror 72 of the second-axis resonant scanner 71a on the one side and the mirror 72 of the second-axis resonant scanner 71b on the other side are rotated in the same direction about the axes Qy in an interlocked manner.

Specifically, when the mirror 72 of the second-axis resonant scanner 71a on the one side is rotated in a direction of arrow Ky1 about the axis Qy, the mirror 72 of the second-axis resonant scanner 71b on the other side is rotated in a direction of arrow Ky1 about the axis Qy. When the mirror 72 of the second-axis resonant scanner 71a on the one side is rotated in a direction of arrow Ky2 opposite to arrow Ky1 about the axis Qy, the mirror 72 of the second-axis resonant scanner 71b on the other side is rotated in a direction of arrow Ky2 opposite to arrow Ky1 about the axis Qy. In addition, a maximum deflection angle A of the mirror 72 of the second-axis resonant scanner 71a on the one side and a maximum deflection angle A of the mirror 72 of the second-axis resonant scanner 71b on the other side are equal, a rotational frequency of the mirror 72 of the second-axis resonant scanner 71a on the one side and a rotational frequency of the mirror 72 of the second-axis resonant scanner 71b on the other side are equal, and the mirrors 72 are rotated about the axes Qy by the scanning parts 73. The rotation of the mirror 72 of the second-axis resonant scanner 71a on the one side from the direction corresponding to the zero angle and the rotation of the mirror 72 of the second-axis resonant scanner 71b on the other side from the direction corresponding to the zero angle are equal in phase when the mirrors 72 are rotated about the axes Qy by the scanning parts 73. In this manner, the pair of second-axis resonant scanners 71a and 71b are oscillated with the paired resonant scanners in the same phase.

In addition, the maximum deflection angle A of the mirrors 72 of the second-axis resonant scanners 71a and 71b is equal to the maximum deflection angle A of the mirrors 62 of the first-axis resonant scanners 61a and 61b when the mirrors 62 and 72 are rotated about the axes Qx and Qy by the scanning parts 63 and 73, respectively. The rotational frequency of the mirrors 72 of the second-axis resonant scanners 71a and 71b is equal to the rotational frequency of the mirrors 62 of the first-axis resonant scanners 61a and 61b when the mirrors 62 and 72 are rotated about the axes Qx and Qy by the scanning parts 63 and 73, respectively. Further, the phase of rotation of the mirrors 72 of the second-axis resonant scanners 71a and 71b and the phase of rotation of the mirrors 62 of the first-axis resonant scanners 61a and 61b are shifted from each other by one quarter of the period when the mirrors 62 and 72 are rotated about the axes Qx and Qy by the scanning parts 63 and 73, respectively. Note that the resonant scanners 61a, 61b, 71a and 71b are also called resonance type oscillators, resonant oscillators and the like. In addition, in regard of the resonant scanners 61a, 61b, 71a and 71b, the orientation of the mirror surface having a normal in a direction for equally bisecting the angle formed between the normal to the mirror surface corresponding to the maximum deflection angle A and the normal to the mirror surface corresponding to the maximum deflection angle −A at the time of driving can be defined as the zero angle of the mirror. Besides, in regard of the resonant scanners 61a, 61b, 71a and 71b, the orientation of the surface of the mirror when resonance is not occurring may be taken as zero.

In this way, the laser processing apparatus 1 forms through-holes VH by oscillating the first-axis resonant scanners 61a and 61b and the second-axis resonant scanners 71a and 71b while fixing them at a phase difference of 90°. In addition, the laser beam applying unit 20 is operated in such a manner that the mirrors 62 of the first-axis resonant scanners 61a and 61b and the mirrors 72 of the second-axis resonant scanners 71a and 71b are rotated about the axes Qx and Qy by the scanning parts 63 and 73, respectively, in the aforementioned manner, whereby the optical path $L_{AX}$ of the laser beam L is changed in such a manner as to obtain a circular beam spot. In addition, the laser beam applying unit 20 uses the telecentric f-θ lens as the focusing lens 23, whereby the optical path $L_{AX}$ of the laser beam L can be changed in such a manner that even when the through-hole VH is formed from the side of the back side WR of the wafer W held on the chuck table 10, the through-hole VH has the same circular shape of the same size at the back side WR of the wafer W and at the bottom surface of the through-hole VH. Note that the mirror 24, the first optical path changing means 60 and the second optical path changing means 70 are provided, for example, inside the casing 21.

The control unit 100 controls the aforementioned components of the laser processing apparatus 1. The control unit 100 causes the laser processing apparatus 1 to perform a processing operation of forming the through-holes VH extending from the back side WR of the wafer W to reach the bonding pads PD. Note that the control unit 100 is composed mainly of a microprocessor (not shown) including a processor (composed, for example, of a CPU), a ROM, a RAM and the like, and is connected with display means for displaying the states of the processing operation, and operating means used when an operator registers processing information and the like.

Now, a method of forming a through-hole by use of the laser processing apparatus 1 according to this embodiment will be described below, referring to the drawings. The method of forming a through-hole is a method of applying the laser beam L to the back side WR of the wafer W by the laser processing apparatus 1 to thereby form through-holes VH reaching the bonding pads PD.

In the method of forming a through-hole, first, the operator registers processing information in the control unit 100, the operator places the wafer W on the holding surface 10a of the chuck table 10 spaced from the laser beam applying unit 20, and the laser processing apparatus 1 starts a processing operation when an instruction to start the processing operation is given. In the processing operation, the control unit 100 causes the wafer W to be suction held on the holding surface 10a of the chuck table 10, and causes the clamp parts 11 to clamp the annular frame F. The control unit 100 moves the chuck table 10 toward a position under the laser beam applying unit 20 by the X-axis moving means 40 and the Y-axis moving means 50, positions the wafer W held on the chuck table 10 at a position under imaging means (not shown) for the laser beam L, and causes the imaging means to perform imaging. The imaging means outputs image information to the control unit 100. Then, the control unit 100 carries out image processing such as pattern matching, indexes positions at which to form through-holes VH in the wafer W, and adjusts the relative positions of the wafer W held on the chuck table 10 and the laser beam applying unit 20 in such a manner that a through-hole VH can be formed at one of the indexed positions.

Figure 8:
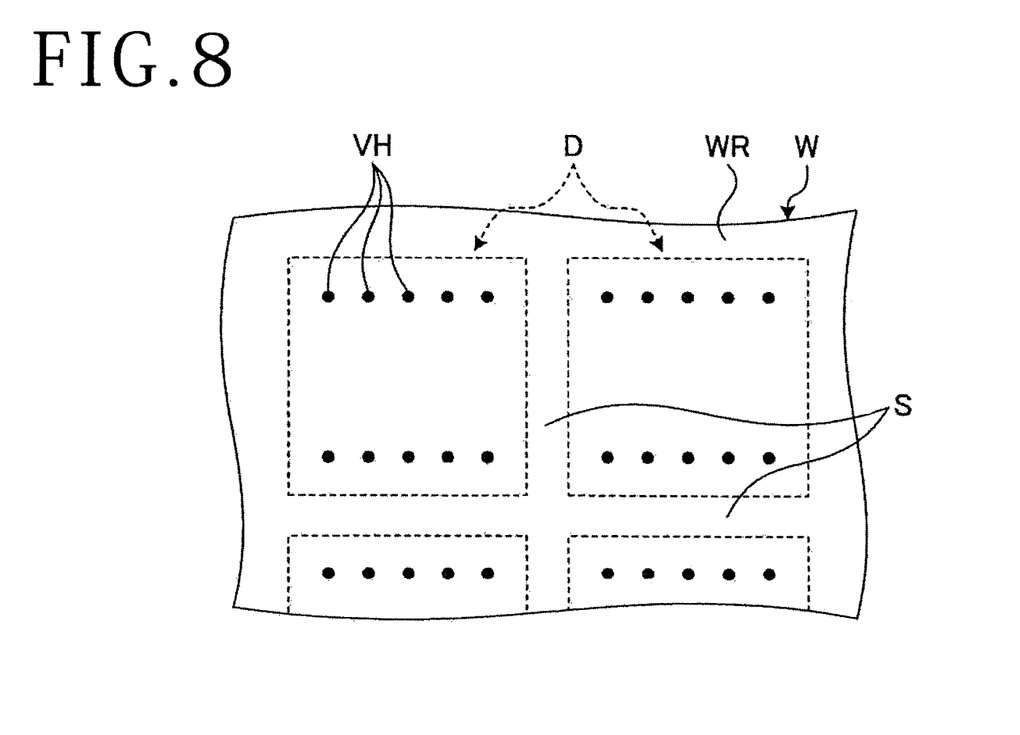
FIG. 8 is a plan view showing part VIII of FIG. 7 in a magnified form.

Then, the control unit 100 causes the laser oscillator 22 to oscillate the laser beam L, and guides the oscillated laser beam L to the pair of first-axis resonant scanners 61a and 61b, to change the optical path $L_{AX}$ of the laser beam L into the Y-axis direction relative to the optical axis P of the focusing lens 23. In addition, the control unit 100 guides the laser beam L passed through the pair of first-axis resonant scanners 61a and 61b to the pair of second-axis resonant scanners 71a and 71b to change the optical path $L_{AX}$ into the X-axis direction, whereby the laser beam L whose optical path $L_{AX}$ has been changed into the Y-axis direction and then into the X-axis direction is applied to the wafer W held on the chuck table 10. Subsequently, the control unit 100 forms a through-hole VH from the side of the back side WR of the wafer W, as depicted in FIGS. 6 and 8.

After one through-hole VH is formed, the control unit 100 stops the oscillation of the laser beam L, then adjusts the relative positions of the wafer W held on the chuck table 10 and the laser beam applying unit 20 in such a manner that the next through-hole VH can be formed, and thereafter forms a through-hole VH in the same manner as above. After all the through-holes VH are formed, the control unit 100 stops the oscillation of the laser beam L, moves the chuck table 10 to a position spaced from the laser beam applying unit 20, and then releases the suction holding of the chuck table 10 and the clamping of the clamp parts 11. Then, the wafer W formed therein with all the through-holes VH is detached from the chuck table 10 by the operator, a wafer W yet to be formed with through-holes VH is placed on the chuck table 10 by the operator, and the aforementioned steps are repeated, to form through-holes VH in the wafer W.

Thus, the method of forming a through-hole includes the step of oscillating the laser beam L from the laser oscillator 22, the step of guiding the oscillated laser beam L to the pair of first-axis resonant scanners 61a and 61b to change the optical path $L_{AX}$ of the laser beam L into the Y-axis direction relative to the optical axis P of the focusing lens 23, the step of guiding the laser beam L passed through the pair of first-axis resonant scanners 61a and 61b to the pair of second-axis resonant scanners 71a and 71b to change the optical path $L_{AX}$ of the laser beam L into the X-axis direction orthogonal to the Y-axis direction, and the step of applying the laser beam L whose optical path $L_{AX}$ has been changed into the Y-axis direction and then into the X-axis direction to the wafer W held by the chuck table 10.

As aforementioned, according to the laser processing apparatus 1 in this embodiment, the laser beam applying unit 20 includes the first optical path changing means 60 that has the pair of first-axis resonant scanners 61a and 61b for changing the optical path $L_{AX}$ of the laser beam L into a direction parallel to the Y-axis direction, and the second optical path changing means 70 that has the pair of second-axis resonant scanners 71a and 71b for changing the optical path $L_{AX}$ of the laser beam L into a direction parallel to the X-axis direction. The laser beam applying unit 20 has a configuration wherein the maximum deflection angle A and the rotational frequency of the mirrors 62 of the first-axis resonant scanners 61a and 61b are equal respectively to the maximum deflection angle A and the rotational frequency of the mirrors 72 of the second-axis resonant scanners 71a and 71b. In addition, the laser beam applying unit 20 has a configuration wherein the phase of rotation of the mirrors 62 of the first-axis resonant scanners 61a and 61b and the phase of rotation of the mirrors 72 of the second-axis resonant scanners 71a and 71b are shifted from each other by one quarter of the period. Therefore, the laser processing apparatus 1 causes the laser beam L to be made eccentric in such a manner as to obtain a circular beam spot. Besides, the laser processing apparatus 1 uses the telecentric f-θ lens as the focusing lens 23, whereby the optical path $L_{AX}$ of the laser beam L can be changed in such a manner that even when a through-hole VH is formed from the side of the back side WR of the wafer W held on the chuck table 10, the through-hole VH has the same circular shape of the same size at the back side WR of the wafer W and at the bottom surface of the through-hole VH.

In addition, in the method of forming a through-hole, the through-holes VH are formed from the side of the back side WR of the wafer W by use of the laser processing apparatus 1 configured as aforementioned, and, therefore, the through-holes VH having a uniform inside diameter and being circular in plan view can be formed in the wafer W from the side of the back side WR toward the side of the front side WS. Since the through-holes VH having a uniform inside diameter and being circular in plan view can be formed in the wafer W by the laser processing apparatus 1 and the method of forming a through-hole according to the aforementioned embodiment, it is possible to perform laser processing such that the bottom surface and the inner circumferential surface of the through-hole VH can be made orthogonal to each other, and the shape of the through-hole VH can be made to be a desired shape. Accordingly, the forming method according to the aforementioned embodiment can process the wafer W as a workpiece into a desired shape.

Note that the present invention is not to be limited to the embodiment. In other words, the present invention can be carried out with various modifications within the scope of the gist of the invention. For example, a configuration may be adopted wherein a mirror for reflecting the laser beam L is disposed between the first-axis and second-axis resonant scanners 61a and 71a on the one side and the first-axis and second-axis resonant scanners 61b and 71b on the other side, the mirrors 62 of the pair of first-axis resonant scanners 61a and 61b are rotated in opposite directions in an interlocked manner, and the mirrors 72 of the pair of second-axis resonant scanners 71a and 71b are rotated in opposite directions in an interlocked manner.

In addition, the laser processing apparatus 1 according to the present invention may have a configuration wherein the maximum deflection angle A and the rotational frequency of the mirrors 62 of the pair of first-axis resonant scanners 61a and 61b, the maximum deflection angle A and the rotational frequency of the mirrors 72 of the pair of second-axis resonant scanners 71a and 71b, and the phase shift between the rotation of the mirrors 62 of the first-axis resonant scanners 61a and 61b and the rotation of the mirrors 72 of the second-axis resonant scanners 71a and 71b are arbitrarily changed, whereby the optical path $L_{AX}$ of the laser beam L is changed in such a manner that the beam spot has an arbitrary shape. In the laser processing apparatus 1 and the forming method according to the present invention, a workpiece may be processed into other shapes, such as to form grooves or the like instead of the through-holes VH.

The present invention is not limited to the details of the above described preferred embodiment. The scope of the invention is defined by the appended claims and all changes and modifications as fall within the equivalence of the scope of the claims are therefore to be embraced by the invention.

What is claimed is:

1. A laser processing apparatus for perforating a workpiece having a plurality of devices formed on the front side of the workpiece, comprising:

a chuck table on which to hold the workpiece;

a laser beam applying unit that applies a laser beam on the workpiece; and a control unit that controls the laser processing apparatus, wherein the laser beam applying unit includes a laser beam oscillation unit that oscillates the laser beam, first optical path changing means, disposed on a downstream side with respect to a propagating direction of the laser beam oscillated from the laser beam oscillation unit, for changing an optical path of the laser beam in relation to an optical axis of the focusing lens, the first optical path changing means including a pair of first mirrors each having a reflection surface and being connected to a corresponding first-axis resonant scanner which rotates the reflection surface of the corresponding first mirror about a corresponding first axis, each of the first axes being parallel to the reflection surface of the corresponding first mirror, second optical path changing means, disposed between the first optical path changing means and the focusing lens, for changing the optical path of the laser beam in relation to the optical axis of the focusing lens, the second optical path changing means including a pair of second mirrors each having a reflection surface and being connected to a corresponding second-axis resonant scanner which rotates the reflection surface of the corresponding second mirror about a corresponding second axis, each of the second axes being parallel to the reflection surface of the corresponding second mirror, and a focusing lens, located downstream of the second optical path changing means, for focusing and applying the laser beam oscillated from the laser beam oscillation unit on the workpiece held on the chuck table, wherein the control unit is configured to control the pair of first-axis resonant scanners to be positioned relative to each other to change a shape of a beam spot of the laser beam into a first shape, and the pair of second-axis resonant scanners to be positioned relative to each other to change the first shape of the beam spot from the first-axis resonant scanners into a second shape different from the first shape, and wherein the control unit is configured to control the first-axis resonant scanners to rotate the reflection surfaces of the first mirrors about the corresponding first axes at a first rotational frequency and the second-axis resonant scanners to rotate the reflection surfaces of the second mirrors about the corresponding second axes at a second rotational frequency equal to the first rotational frequency, with a phase of rotation of the second mirrors shifted by one quarter of a period from a phase of rotation of the first mirrors.

2. The laser processing apparatus according to claim 1, wherein the laser beam is applied to a back side of the workpiece to form a plurality of discrete through-holes in the workpiece.

3. The laser processing apparatus according to claim 2, wherein the through-holes extend from the back side of the workpiece to a bonding pad formed on the front side of the workpiece for attaching the devices to the workpiece.

4. The laser processing apparatus according to claim 2, wherein a shape of a bottom of each of the through-holes formed by the laser beam is a same shape as the beam spot applied to the back side of the workpiece to form the through-holes.

5. The laser processing apparatus according to claim 2, wherein a side wall and a bottom of each of the through-holes are orthogonal to each other.

* * * * *